United States Patent
Tomren

(10) Patent No.: US 9,868,450 B2
(45) Date of Patent: Jan. 16, 2018

(54) DOLLY SYSTEM

(71) Applicant: Electric Friends AS, Oslo (NO)

(72) Inventor: Anders Tomren, Oslo (NO)

(73) Assignee: Electric Friends AS, Oslo (NO)

( * ) Notice: Subject to any disclaimer, the term of this patent is extended or adjusted under 35 U.S.C. 154(b) by 0 days.

(21) Appl. No.: 15/288,250

(22) Filed: Oct. 7, 2016

(65) Prior Publication Data

US 2017/0101112 A1 Apr. 13, 2017

(30) Foreign Application Priority Data

Oct. 8, 2015 (NO) .................................... 20151356

(51) Int. Cl.
*B61B 13/00* (2006.01)
*B61D 17/00* (2006.01)

(52) U.S. Cl.
CPC .............. *B61B 13/00* (2013.01); *B61D 17/00* (2013.01)

(58) Field of Classification Search
CPC ......... B61B 13/00; B61B 13/02; B61D 17/00; B61D 17/005; B61D 17/04; F16M 11/425
See application file for complete search history.

(56) References Cited

U.S. PATENT DOCUMENTS

| | | | | |
|---|---|---|---|---|
| 4,398,469 A | * | 8/1983 | Zelli | B61D 15/00 105/169 |
| 4,520,733 A | * | 6/1985 | Willmann | B61B 13/04 104/110 |
| 5,711,227 A | * | 1/1998 | Johnson | E01B 23/00 104/106 |
| 6,557,775 B1 | * | 5/2003 | Brinson | E01B 23/04 238/10 R |
| 7,363,864 B2 | * | 4/2008 | Broek | B25H 5/00 104/106 |
| 8,973,505 B2 | * | 3/2015 | Hurd | F16M 11/18 104/165 |
| 9,094,590 B2 | * | 7/2015 | Wood | H04N 5/2251 |
| 9,625,084 B2 | * | 4/2017 | Garland | F16M 11/2085 |

(Continued)

FOREIGN PATENT DOCUMENTS

| | | |
|---|---|---|
| DE | 358029 | 9/1922 |
| DE | 358029 C | 9/1922 |
| GB | 208340 | 12/1923 |
| GB | 208340 A | 12/1923 |
| GB | 2324776 A | 11/1998 |
| NL | 11519 | 1/1924 |
| NL | 11519 C | 1/1924 |

OTHER PUBLICATIONS

Norwegian Search Report, dated May 6, 2016 for Norwegian Patent Application No. 20151356, 2 pages.

(Continued)

*Primary Examiner* — Jason C Smith
(74) *Attorney, Agent, or Firm* — Christopher & Weisberg, P.A.

(57) ABSTRACT

A dolly system is disclosed, which overcomes drawbacks related to unwanted noise and jerks of prior art dolly systems. The dolly system comprises wheel assemblies (130) that have independently rotating lateral support wheels (132, 133) in combination with a center wheel (131) that interact with a continuous resilient element (122) when rolling along a rail track, without encountering any gaps or bumps and without producing squeal noise due to so-called wheel-climbing that may occur in curves along the rail track.

6 Claims, 3 Drawing Sheets

(56) References Cited

U.S. PATENT DOCUMENTS

| | | | | |
|---|---|---|---|---|
| 2002/0064386 A1* | 5/2002 | Losmandy | ............ | F16M 11/425 |
| | | | | 396/419 |
| 2007/0011933 A1* | 1/2007 | Robert | ............... | A01G 13/0237 |
| | | | | 43/1 |
| 2007/0079724 A1* | 4/2007 | Lohr | ....................... | E01B 25/28 |
| | | | | 105/72.2 |
| 2009/0315288 A1* | 12/2009 | Hernandez | ............ | F16M 11/425 |
| | | | | 280/79.3 |
| 2013/0302024 A1* | 11/2013 | Eckert | .................. | G03B 17/561 |
| | | | | 396/427 |
| 2014/0299013 A1* | 10/2014 | Hall | ........................ | B61B 13/00 |
| | | | | 104/307 |
| 2016/0142621 A1* | 5/2016 | Tomren | .................. | B25J 9/1689 |
| | | | | 348/211.8 |
| 2017/0101112 A1* | 4/2017 | Tomren | .................. | B61D 17/00 |

OTHER PUBLICATIONS

International-Type Search Report, dated May 27, 2016 for Norwegian Patent Application No. 20151356, 4 pages.
Norwegian Office Action, dated May 6, 2015 for Norwegian Patent Application No. 20151356, 3 pages.
International Search Report and Written Opinion dated Dec. 13, 2016 for corresponding International Application No. PCT/EP/2016/073959 International Filing Date Oct. 7, 2016 consisting of 13-pages.

\* cited by examiner

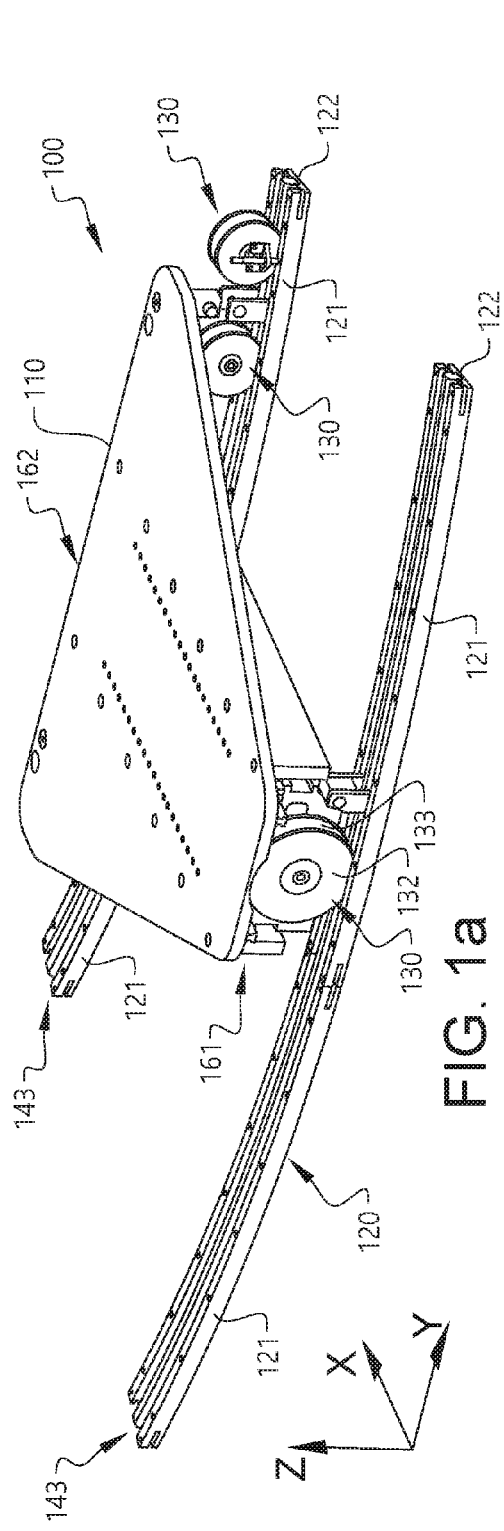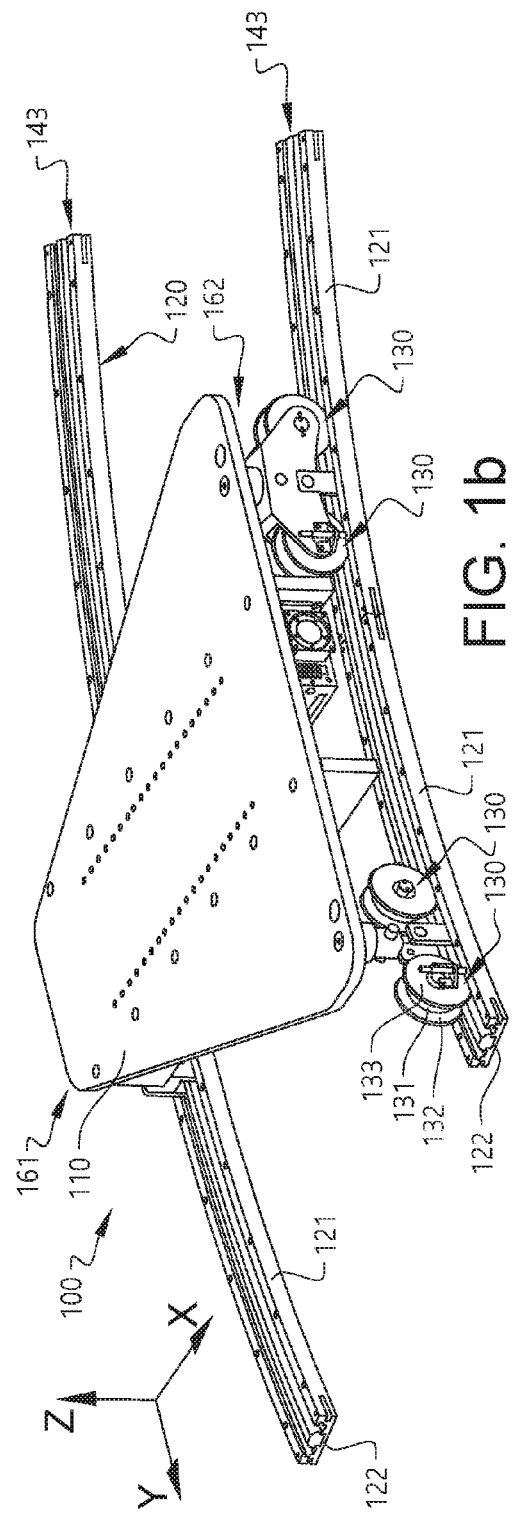
FIG. 1a
FIG. 1b

DOLLY SYSTEM

CROSS-REFERENCE TO RELATED APPLICATION

This application is related to and claims priority to Norwegian Patent Application Serial No. 20151356, filed Oct. 8, 2015, entitled IMPROVED DOLLY SYSTEM, the entirety of which is incorporated herein by reference.

STATEMENT REGARDING FEDERALLY SPONSORED RESEARCH OR DEVELOPMENT n/a

TECHNICAL FIELD

Camera dolly systems are used in the television (TV) and motion picture industries to support and maneuver a camera. Typically, a camera dolly comprises a platform on wheels and has an arm to raise and lower the camera. The camera dolly is generally moved by dolly operators either by a manual hands-on steering or by means of a motor remotely controlled by operators in a remote control room.

BACKGROUND

In the production of motion pictures, a motion picture camera must often be moved from one position to another. The camera movements may require a change in camera position, camera angle or camera elevation. The camera movement must be performed smoothly, as even small amounts of vibration of the camera can result in unsatisfactory filming results, due to shaky or erratic recorded images. Similar requirements must often be met in the case of TV studio productions, e.g. predefined camera movements that are to be performed along the studio floor.

Camera dollies and pedestals have long been used to support and move motion picture cameras. Typically, a camera dolly has four wheels or pairs of wheels on a platform or chassis having a square shaped wheel base. The wheels may be attached to the chassis via articulated legs, or the wheels may be directly pivotally attached to the chassis. The camera dolly must support and enable maneuvering of the camera with a minimum of vibration or shock, to avoid degrading the filmed image quality. Consequently, a camera dolly must be designed, manufactured and maintained with precision, and the dolly may be placed on rails or tracks on the studio floor to provide an even and smooth rolling surface.

Regular camera dollies roll over rail tracks that have joint cuts between rail sections perpendicular to the direction of elongation of the rail track. A drawback with this is that, at some point each wheel will roll over these joint cuts. Therefore, there are points where the wheel is only supported by cuts between two rail sections. This joint has the potential to create a bump or jerk as the wheel roll over it. As mentioned above, the dolly of a TV or motion picture camera must be very smooth otherwise the bump or jerk will be seen on the resulting recording/film.

A currently available solution for mitigating this drawback is micro-accurate engineering in the process of manufacturing the ends of rail sections, often using heavy and expensive metal work machinery. Typically, prior art rail sections have a solid rod that protrudes from the end of one section and a round hollow receptor in the end of the other section. These are called the male and female ends of the sections and they slot together and kept tight with a locking system. If there is any gap or if the two sections are not absolutely straight, the joints will cause slight jerks when the dolly platform wheels roll over them. To minimize this bump or jerk, much time and effort is used during the setup of the dolly system so as to ensure the camera does not feel any bump.

However, such prior art solutions further require rail tracks of relatively large dimensions, and when being placed on top of a studio floor, creates an obstacle protruding up to 20 cm from the floor surface. On the other hand, an immersion of such a rail track to avoid it being an obstacle would require a deep trench in the floor, which would represent a permanent damage in the floor structure, and limit the possibility mobility, for reorganizing the studio and for using the studio for other purposes than TV production.

Another problem with camera dollies on rail tracks is the well-known rail wheel squeal which is a noise that is generated when a dolly moves more or less rapidly along rail track curves. Needless to say, studio noise is particularly important to avoid in TV studios because of the nature of the indoor environment of reflections and small distances from sound source to sound recorders.

Therefore there is a need for arrangements related to a dolly system that are capable of resolving or at least mitigating at least some of the abovementioned drawbacks.

The prior art includes U.S. Pat. No. 6,557,775 where a dolly system is described, which has drawbacks as discussed above.

SUMMARY

In view of the above, an object of the present disclosure is to overcome or at least mitigate at least some of the drawbacks related to dolly systems.

This is achieved in one aspect by a dolly system a dolly system that comprises a dolly platform, a rail assembly and at least one wheel assembly. The rail assembly comprises at least one elongated rail section configured to be joined together to form a rail track. An elongated continuous resilient element, e.g. made by a rubber, is configured to be attached to the at least one rail section along the rail track. The at least one wheel assembly is configured to be attached to the dolly platform and configured to roll along the rail track on top of the elongated continuous resilient element. The wheel assembly comprises a center wheel configured to support the dolly platform in a vertical direction, z, a first lateral support wheel and a second lateral support wheel. The lateral support wheels are configured to support the dolly platform in a horizontal direction, x. The first lateral support wheel and the second lateral support wheel are arranged concentrically and on either side with respect to the center wheel. The first lateral support wheel and the second lateral support wheel have a respective radial extension, $r_1$, $r_2$, that are larger than a radial extension, $r_0$, of the center wheel and the first lateral support wheel and the second lateral support wheel are configured to rotate independent of each other and independent of the center wheel.

In other words, drawbacks related to unwanted noise and jerks of prior art dolly systems are overcome by the dolly system of the present disclosure. The independently rotating lateral support wheels in combination with a center wheel interact with the continuous resilient element when rolling along the rail track, without encountering any gaps or bumps and without producing squeal noise due to so-called wheel-climbing that may occur in curves along the rail track.

Embodiments include those where a cross section of the continuous resilient element, perpendicular to a direction of elongation of the continuous resilient element, matches a profile of a radial cross section of the wheel assembly.

Embodiments include those where the elongated continuous resilient element has a length that corresponds to a length of the rail track.

In some embodiments, a profile of a cross section of the continuous resilient element, perpendicular to a direction of elongation of the continuous resilient element is such that, when attached to the at least one rail section, an elongated cavity is formed between the at least one rail section and the resilient element.

In a second aspect there is provided a rail assembly for a dolly system. The rail assembly comprises at least one elongated rail section configured to be joined together to form a rail track and an elongated continuous resilient element configured to be attached to the at least one rail section along the rail track.

In a third aspect there is provided a wheel assembly for a dolly system. The wheel assembly is configured to be attached to a dolly platform and configured to roll along a rail track on top of an elongated continuous resilient element. The wheel assembly comprises a center wheel configured to support the dolly platform in a vertical direction, z, a first lateral support wheel and a second lateral support wheel. The lateral support wheels are configured to support the dolly platform in a horizontal direction, x. The first lateral support wheel and the second lateral support wheel are arranged concentrically and on either side with respect to the center wheel. The first lateral support wheel and the second lateral support wheel have a respective radial extension, r1, r2, that are larger than a radial extension, r0, of the center wheel and the first lateral support wheel and the second lateral support wheel are configured to rotate independent of each other and independent of the center wheel.

These other aspects have various embodiments, effects and advantages that correspond to those discussed above in connection with the first aspect.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIGS. 1a and 1b are schematically illustrated perspective views of a dolly system;

DETAILED DESCRIPTION

Figure 2:
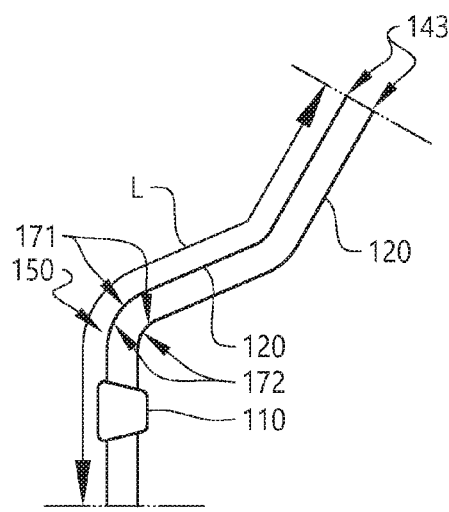
FIG. 2 is a view from above schematically illustrated rail track.

With reference to FIGS. 1a and 1b, the present disclosure relates to a dolly system 100. FIGS. 1a and 1b are perspective views of the dolly system 100. The dolly system 100 comprises a dolly platform 110, a rail assembly 120 and a plurality of wheel assemblies 130.

In the exemplifying embodiment of FIGS. 1a and 1b, the dolly platform 110 is trapezoid shaped with one wheel assembly 130 mounted on the short side 161 of the trapezoid shaped dolly platform 110 and two pairs of three parted wheel assemblies 130 mounted on the long side 162 of the trapezoid shaped dolly platform 110, respectively placed near each edge of the dolly platform 110.

The rail assembly 120 comprises a plurality of elongated rail sections 121, for example in the form of milled aluminum profiles. The elongated rail sections 121 are configured to be joined together to form a rail track 143. Needless to say, in FIGS. 1a and 1b, the elongated rail sections 121 are few in numbers and the rail track 143 is therefore relatively short. In fact, embodiments of a rail assembly 120 include those having only a single rail section 121. In such embodiments, the rail track 143 is realized by such a single rail section 121. However, in the following, the number of rail sections 121 is plural.

FIG. 2 illustrates, schematically, how a larger number of rail sections have been joined to form rail tracks 143 having a length L and on top of which rail tracks 143, the dolly platform 110 is located. Moreover, in FIG. 2 a curve 150 in the rail tracks 143 is also illustrated.

The rail assembly 120 further comprises an elongated continuous resilient element 122. The continuous resilient element 122 is configured to be attached to the rail sections 121 along the rail track 143 and it may have a length that corresponds to the length, L, of the rail track 143. The elongated continuous resilient element 122 may be made of a rubber, i.e. any appropriate synthetic or natural elastomeric polymer, which has been extruded in a suitable extrusion apparatus or manufactured in any other appropriate manner.

As illustrated in FIG. 2, long seamless tracks 143 are provided for camera dollies, the rail tracks 143 having no bumps. Moreover, the rail assembly 120 is very compact and thereby enables a less visible structure that does not form an obstacle on a floor on which it is arranged and, as discussed above, a camera mounted on the dolly platform creates no noise that may be disturbing when moving along the rail tracks 143.

Figure 3:
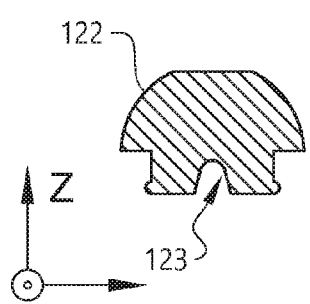
FIG. 3 schematically illustrates, in cross-section, a continuous resilient element.
Figure 4:
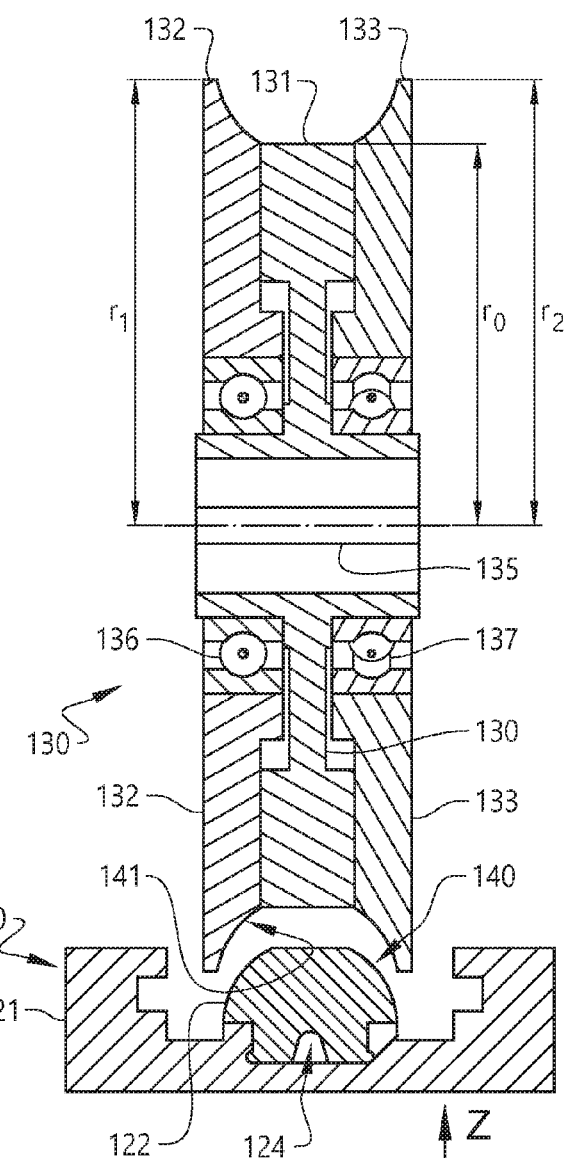
FIG. 4 schematically illustrates, in cross-section, a wheel assembly and a rail assembly.

As FIG. 3 and FIG. 4 illustrate, a profile 123 of a cross section of the continuous resilient element 122, perpendicular to a direction of elongation of the continuous resilient element 122 is such that, when attached to the rail sections 121, an elongated cavity 124, or "slit", is formed between the rail sections 121 and the resilient element 122. Such a cavity 124 may provide a certain grade of flexibility when exposed to the weight of a camera and dolly platform 110 via the wheel assemblies 130.

Turning now to FIG. 4, a wheel assembly 130 will be described in some more detail. The wheel assembly 130 is configured to be attached to the dolly platform 110 and configured to roll along the rail track 143 on top of the elongated continuous resilient element 122. As FIG. 4 illustrates, the wheel assembly 130 comprises a center wheel 131 that is configured to support the dolly platform 110 in a vertical direction, z. The wheel assembly further comprises a first lateral support wheel 132 and a second lateral support wheel 133. These first and second lateral support wheels 132, 133 are configured to support the dolly platform 110 in a horizontal direction, x. The first lateral support wheel 132 and the second lateral support wheel 133 are arranged concentrically and on either side with respect to the center wheel 131. Moreover, the first lateral support wheel 132 and the second lateral support wheel 133 have a respective radial extension, r1, r2, that are larger than a radial extension, r0, of the center wheel 131 and the first lateral support wheel 132 and the second lateral support wheel 133 are configured to rotate independent of each other and independent of the center wheel 131.

In other words, the wheel assembly 130 may be seen as a three-parted construction having a weight bearing center wheel and two lateral wheels that perform a "steering" function. The center wheel 131, attached to or integrated with an axle 135, is formed as a bar with the gravity force of a camera and dolly platform 110 acting vertically towards the top of the elongated resilient, e.g. rubber, element 122. The two lateral support wheels 132, 133 are tightly but independently rotationally connected on each side of the center wheel 131, preferably by means of a respective ball bearing 136, 137.

As exemplified in FIG. 4, a profile 140 of a cross section of the continuous resilient element 122, perpendicular to a direction of elongation of the continuous resilient element 122, may match a profile 141 of a radial cross section of the wheel assembly 130. That is, in such an example, the combined cross section profile 141 of the center wheel 131 and the two lateral support wheels 132, 133 is such that it corresponds to the cross sectional profile 140 of the continuous resilient element 122. The two lateral support wheels 132, 133 provide support in the x-direction via surface sides of the continuous resilient element 122.

As exemplified in FIG. 2, when the dolly platform 110 (comprising wheel assembly 130) moves along the rail track 143 into a rail curve 150, an outer side 171 of the rail track 143 and a corresponding outer surface of the continuous resilient element 122 will be longer than an inner side 172 of the rail track 143 and a corresponding inner surface of the continuous resilient element 122, and since the two lateral support wheels 132, 133 are able to rotate independently, a lateral support wheel 132, 133 that is in contact with the outer side 171 will travel farther than a lateral support wheel 132, 133 that is in contact with the inner side 172, a distance corresponding to a difference in lengths of inner and outer surface sides of the continuous resilient element 122. Consequently, so-called "wheel climbing" on the rail track 143 in the curve 150 creating noise in the form of rail wheel squeal will then be avoided, and no such noise will be captured by a microphone during recording using the dolly system 100.

Figure 5:
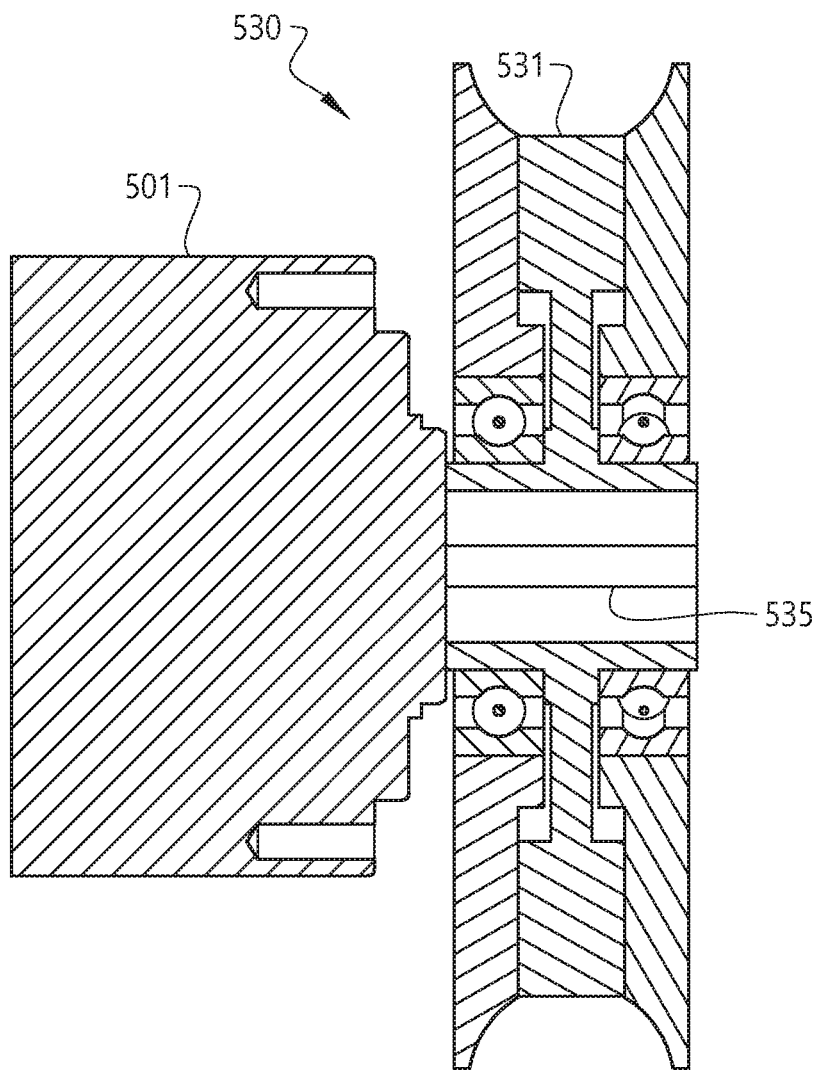
FIG. 5 schematically illustrates, in cross-section, a wheel assembly with an attached motor.

FIG. 5 illustrates an embodiment of a wheel assembly 530 that comprises a motor 501. The motor 501 is connected and adjusted to apply a moment of force on an axle 535 of a center wheel 531 for enabling movement of a camera mounted on a dolly platform, such as the dolly platform 110 illustrated in FIGS. 1 and 2, along a rail track such as the rail track 143 illustrated in FIGS. 1 and 2.

It must be emphasized that the terminology "comprise/comprises" as used in this specification is chosen to specify the presence of stated features, numbers, steps or components, but does not preclude the presence or addition of one or more other functions, numbers, steps, components or groups thereof. It should also be noted that the word "a" or "an" preceding an element does not exclude the presence of a plurality thereof.

What is claimed is:

1. A dolly system comprising:
    a dolly platform, a rail assembly comprising:
        at least one elongated rail section configured to be joined together to form a rail track,
        an elongated continuous resilient element configured to be attached to the at least one rail section along the rail track,
        at least one wheel assembly configured to be attached to the dolly platform and configured to roll along the rail track on top of the elongated continuous resilient element, said wheel assembly comprising:
            a center wheel configured to support the dolly platform in a vertical direction, z,
            a first lateral support wheel and a second lateral support wheel configured to support the dolly platform in a horizontal direction, x, where:
                the first lateral support wheel and the second lateral support wheel arranged concentrically and on either side with respect to the center wheel, and wherein:
                    the first lateral support wheel and the second lateral support wheel have a respective radial extension, r1, r2, that are larger than a radial extension, r0, of the center wheel;
                    the first lateral support wheel and the second lateral support wheel are configured to rotate independent of each other and independent of the center wheel;
        where a profile of a cross section of the continuous resilient element, perpendicular to a direction of elongation of the continuous resilient element, matches a profile of a radical cross section of the wheel assembly; and
        the profile of the cross section of the continuous resilient element, perpendicular to a direction of elongation of the continuous resilient element is such that, when attached to the at least one rail section, an elongated cavity is formed between the at least one rail section and the resilient element.

2. The dolly system of claim 1, where the elongated continuous resilient element has a length that corresponds to a length, L, of the rail track.

3. The dolly system of claim 1, where the elongated continuous resilient element is made of a rubber.

4. A rail assembly for a dolly system, said rail assembly comprising:
    at least one elongated rail section configured to be joined together to form a rail track;
    an elongated continuous resilient element configured to be attached to the at least one rail section along the rail track;
    where a profile of a cross section of the continuous resilient element, perpendicular to a direction of elongation of the continuous resilient element, matches a profile of a radial cross section of a wheel assembly; and
    the profile of the cross section of the continuous resilient element, perpendicular to the direction of elongation of the continuous resilient element is such that, when attached to the at least one rail section, an elongated cavity is formed between the rail section and the resilient element.

5. The rail assembly of claim 4, where the elongated continuous resilient element has a length that corresponds to a length, L, of the rail track.

6. The rail assembly of claim 4, where the elongated continuous resilient element is made of a rubber.

* * * * *